(12) United States Patent
Farris et al.

(10) Patent No.: US 12,113,755 B2
(45) Date of Patent: *Oct. 8, 2024

(54) AUTO-ADJUST APP OPERATION IN RESPONSE TO DATA ENTRY ANOMALIES

(71) Applicant: Bank of America Corporation, Charlotte, NC (US)

(72) Inventors: Taylor Farris, Hoboken, NJ (US); Patricia Gillis, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/515,348

(22) Filed: Nov. 21, 2023

(65) Prior Publication Data

US 2024/0089221 A1 Mar. 14, 2024

Related U.S. Application Data

(63) Continuation of application No. 17/745,972, filed on May 17, 2022, now Pat. No. 11,870,739.

(51) Int. Cl.
*H04L 51/02* (2022.01)
*H04L 51/234* (2022.01)

(52) U.S. Cl.
CPC ............ *H04L 51/02* (2013.01); *H04L 51/234* (2022.05)

(58) Field of Classification Search
CPC .............................. H04L 51/02; H04L 51/234
See application file for complete search history.

(56) References Cited

U.S. PATENT DOCUMENTS

| | | | |
|---|---|---|---|
| 9,152,216 B1 | 10/2015 | Xu | |
| 10,149,130 B2* | 12/2018 | Choi | G06F 3/048 |
| 2008/0147407 A1 | 6/2008 | Da Palma et al. | |
| 2011/0050576 A1* | 3/2011 | Forutanpour | G06F 3/04886 345/173 |
| 2014/0040748 A1* | 2/2014 | Lemay | G06F 16/9562 715/728 |
| 2018/0061400 A1* | 3/2018 | Carbune | G06F 16/9535 |
| 2018/0174020 A1* | 6/2018 | Wu | G06N 3/044 |
| 2019/0156838 A1* | 5/2019 | Kannan | G10L 15/26 |
| 2019/0204868 A1* | 7/2019 | Choi | G06F 3/04845 |

(Continued)

OTHER PUBLICATIONS

"Three Major Problems with Chatbots and Chatbot Development," https://medium.com/@botsideapp/3-major-problems-with-chatbots-and-chatbot-development-503d84e176aa, Aug. 14, 2017.

(Continued)

*Primary Examiner* — Gil H. Lee
*Assistant Examiner* — Juan C Turriate Gastulo
(74) *Attorney, Agent, or Firm* — Weiss & Arons LLP

(57) ABSTRACT

There is much data that is currently not being captured during user interaction with mobile apps that could provide insight into how to effectively address a user concern. Capturing such data may allow auto-adjustments of operational responses provided by mobile apps in response to detecting anomalous user inputs. Such anomalous user inputs may include keyboard dynamics or mobile device movement that deviate from an average or user specific levels. Such anomalous user inputs may indicate that a user concern is particularly urgent. Auto-adjustments to operation of a mobile app may include initiating targeted chatbot or live chat responses.

20 Claims, 5 Drawing Sheets

(56) References Cited

U.S. PATENT DOCUMENTS

2020/0134143 A1* 4/2020 Deole .................. G06F 21/64
2021/0201238 A1 7/2021 Sekar et al.
2021/0216203 A1* 7/2021 Wu ................... H04M 1/72436

OTHER PUBLICATIONS

Hernandez et al., "Under Pressure: Sensing Stress of Computer Users," https://www.researchgate.net/publication/266655643_Under_pressure_Sensing_stress_of_computer_users, Retrieved on Apr. 26, 2022.

Lee et al., "The Influence of Emotion on Keyboard Typing: An Experimental Study Using Visual Stimuli," BioMedical Engineering OnLine, 2014.

"Average Typing Speed Infographic," Ratatype, Retrieved on Apr. 26, 2022.

Alpana, "Challenges with Chatbots-Not Just Technical," https://chatbotslife.com/challenges-with-chatbots-not-just-technical-ecb39612422f, Mar. 19, 2017.

"How To Type Faster on Smartphone: 10 Tips for High-Speed Texting," https://www.typewise.app/blog/how-to-type-faster-smartphone-tips, Typwise, Nov. 3, 2021.

Meridean Shean, "IIs It Really "Fine" ?: An Analysis of the Paralinguistic Function of Punctuation in Text Messages," https://scholarship.claremont.edu/cgi/viewcontent.cgi?referer=https://www.google.com/&httpsredir=1&article=1901&context=scripps_theses, Claremont Colleges, 2016.

Won-Gyu Yoo, "Effects of Different Computer Typing Speeds on Acceleration and Peak Contact Pressure of the Fingertips During Computer Typing," https://pubmed.ncbi.nlm.nih.gov/25642037/, 2015.

"Lessons From The Failed Chatbot Revolution—And 7 Industries Where The Tech Is Making A Comeback," CB Information Services, Inc., Jan. 14, 2021.

Jack Guy, "People Are Now Texting Nearly As Fast As They Type," CNN Health, Oct. 2, 2019.

Mike Epstien, "Pressure-Sensitive Keyboard Know When You're Busy, Blocks Notifications," Sep. 15, 2012.

"Words Per Minute," https://en.wikipedia.org/wiki/Words_per_minute, Wikimedia Foundation, Inc., Apr. 21, 2022.

Stephen Marche, "The Chatbot Problem," https://www.newyorker.com/culture/cultural-comment/the-chatbot-problem, Jul. 23, 2021.

Ben Crair, "The Period is Pissed," https://newrepublic.com/article/115726/period-our-simplest-punctuation-mark-has-become-sign-anger, Nov. 25, 2013.

Abhishek Anand, "The Problem with Chatbots—How to Make Them More Human," https://chatbotsmagazine.com/the-problem-with-chatbots-how-to-make-them-more-buman-d7a24c22151e, Apr. 22, 2017.

* cited by examiner

AUTO-ADJUST APP OPERATION IN RESPONSE TO DATA ENTRY ANOMALIES

FIELD OF TECHNOLOGY

This application describes apparatus and methods for auto-adjusting a response of an application ("app") running on a mobile device in response to detecting how input is provided to the app by a user.

BACKGROUND

Currently, there are automated tools that attempt to help users optimize functionality and utility obtained from apps running on their mobile devices. For example, chatbots may be presented to a user. A chatbot generally refers to a computer program that can have text or voice-based conversations with a human user (hereinafter, "user"). Advancements in natural language processing have made it possible for chatbots to hold longer, deeper and more natural conversations with users.

A chatbot may prompt a user to enter a question or chose from a menu of pre-populated options. In response to input received from the user, the chatbot may attempt to decipher the user's question and provide a relevant response. For example, each user may have their own way of typing a message. Some users may type short sentences others long sentences while others may use shorthand or text-speak acronyms.

However, conventionally not all relevant data is captured during a user interaction with a chatbot. An effective chatbot must try to understand not just the characters and words of message that has been submitted by a user, but also the user's intention. Users may feel different at different times, and desire different responses at different times. A user may sometimes wish to direct the chatbot and sometimes may want the chatbot to provide the user with instructions or recommendations.

In face-to-face conversations, a listener gathers information not only from what the speaker is saying, but also from paralinguistic cues. Paralinguistics are the unspoken aspects of a conversation that provide additional layers of meaning to what is being said. Examples of paralinguistic cues are facial expressions, tone used and body language. All of these paralinguistic cues are generally absent in text-based conversations with automated tools such as chatbots. Without the paralinguistic cues, it is difficult for chatbots to interpret the intention of a user.

Due to the technical challenges of an automated tool understanding paralinguistic cues, users have generally found that many of the tasks automated tools are built to perform take more time when an automated tool is involved. Such automated tools still regularly needed human assistance to understand intention and meaning of user inputs. From a technical perspective, building an automated tool capable of understanding context and responding to ambiguous user queries is exceptionally challenging. For example, many chatbots cannot understand enough human language or process enough data to complete complex user requests. Additionally, it is technically difficult to capture contextual information that is relevant to interpretation of user inputs.

It would be desirable to provide technically solutions for automated tools to provide the same kind of experience users obtain while talking to other humans. It would be desirable to provide automated tools that are capable of capturing and integrating contextual and behavioral clues provided by a user. It would be desirable for an automated tool to utilize the captured contextual and behavioral clues to address users' concerns more effectively. It is further desirable to capture such contextual and behavioral clues in a continuous and unobtrusive manner. Therefore, it is desirable to provide apparatus and methods for AUTO-ADJUST APP OPERATION IN RESPONSE TO DATA ENTRY ANOMALIES.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
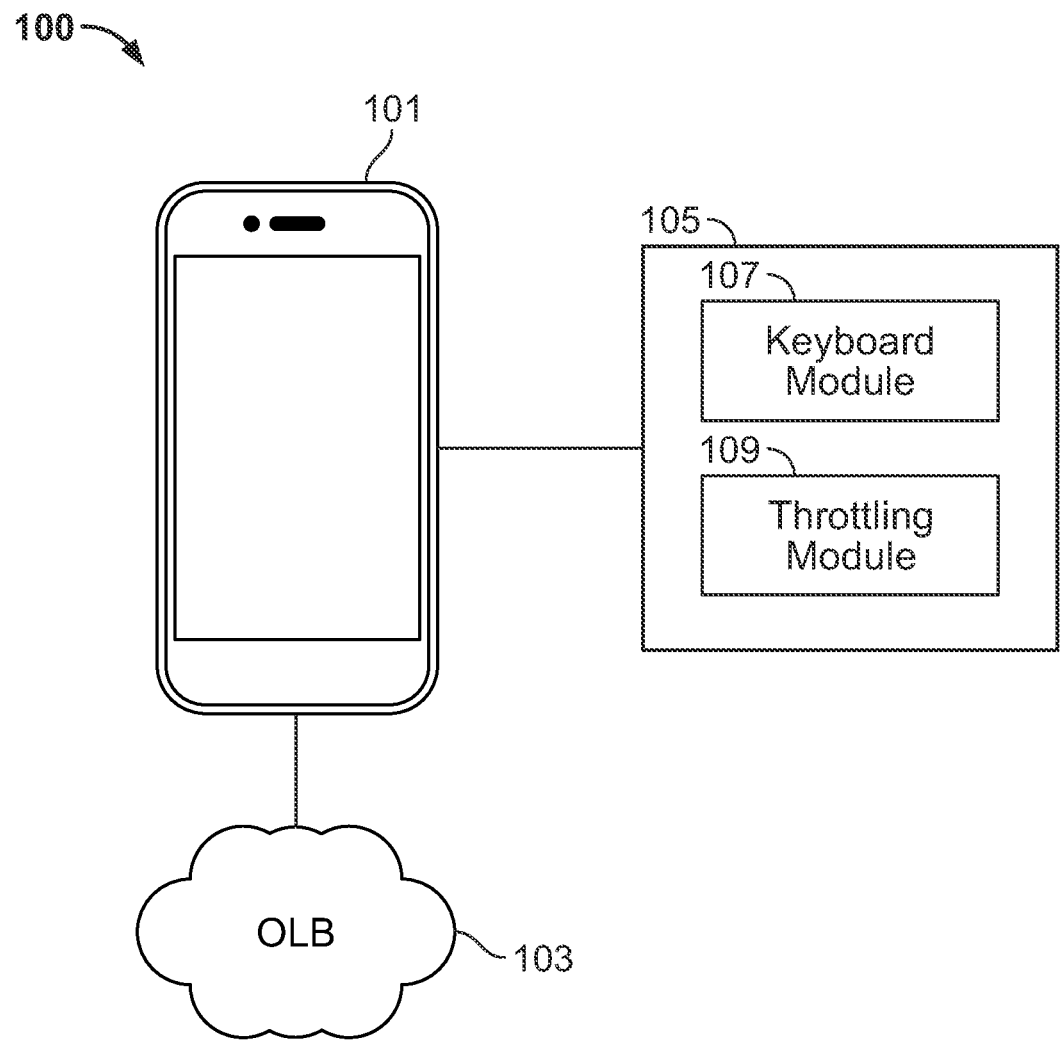
FIG. 1 shows an illustrative system in accordance with principles of the disclosure.

There is much user input data that is currently not being captured during user interaction with an app and automated tool associated with the app. The uncaptured information may provide insight into how an automated tool, such as a chatbot may effectively address a user concern or question about app functionality. The uncaptured information may also be used to adjust operation of the app to better service needs of a user.

A system that dynamically adjusts operation of software running on a mobile device is provided. The system may include an application that provides access to a service. The service may be a protected service. A protected service may be secured by a username and password or other credentials.

The system may include software. The software may include multiple software modules. A software module is a component of the software that is responsible for performing a target function. The software and its associated modules may be executed on a computer system. The computer system may include a mobile device. The computer system may include a remote computer system. The computer system may be a network connected computer system.

A computer system, as disclosed herein, may include a processor circuit. The processor circuit may control overall operation of the computer system and its associated components. The processor circuit may include hardware, such as one or more integrated circuits that form a chipset. The hardware may include digital or analog logic circuitry configured to perform any suitable (e.g., logical) operation.

For example, a computer system may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, or quantify indices; and machine-readable memory.

Machine-readable memory may be a non-transitory media. The machine-readable memory configured to store, in machine-readable data structures: software modules or any other suitable information or data structures. Components of the computer system may be linked by a system bus, wirelessly or by other suitable interconnections. Computer system components may be present on one or more circuit boards. In some embodiments, the components may be integrated into a single chip. The chip may be silicon-based.

The computer system may include RAM, ROM, an input/output ('I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software and the associated modules may be stored within the non-transitory memory and/or other storage medium. Software and modules may provide instructions to the processor that enable the computer system to perform various functions. For example, the non-transitory memory may store software such as an operating system, application programs, and an associated database. Some or all of computer executable instructions may be embodied in hardware or firmware components of a computer system.

A computer system may include cloud computing and virtualization implementations of software. Such implementations may be designed to run on a physical server supplied externally by a hosting provider, a client, or other virtualized platform. Software application programs, which may be used by the computer system, may include computer executable instructions for invoking user functionality related to communication, such as email, short message service ("SMS"), and voice input and speech recognition applications.

A computer system may include a communication circuit. The communication circuit may include a network interface card or adapter. When used in a WAN networking environment, a computer system may include a modem, antenna or other circuitry for establishing communications over a WAN, such as the Internet. The communication circuit may include a modem and/or antenna. The existence of any of various well-known protocols such as TCP/IP, Ethernet, FTP, HTTP and the like is presumed, and the server may be operated in a client-server configuration to permit retrieval of web pages from a web-based server. Web browsers can be used to display and manipulate data on web pages.

A computer system may include various other components, such as a display, battery, speaker, and antennas. Network connected systems may be portable devices such as a laptop, tablet, smartphone, wearables or other "smart" devices (e.g., watches, eyeglasses, clothing having embedded electronic circuitry) or any other suitable device for receiving, storing, transmitting and/or displaying electronic information.

A computer system may include, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices, mobile phones, multiprocessor systems, minicomputer systems, microprocessor systems, mainframe computers, distributed computing environments that include any of the above systems or devices, and the like.

A computer system may utilize computer-executable instructions, such as software modules, executed by a processor. Generally, software modules include routines, programs, objects, components, data structures, etc. that perform particular tasks or implement abstract data types. A computer system may be operational with distributed computing environments where tasks are performed by remote processing devices that are linked through a communications network. In a distributed computing environment, software modules may be located in both local and remote computer storage media including memory storage devices. A computer system may rely on a network of remote computer systems hosted on the Internet to store, manage, and process data (e.g., "cloud computing" and/or "fog computing").

A computer system disclosed herein may be produced by different manufacturers. A computer system may capture data in different formats. A computer system may use different data structures to store captured data. A computer system may utilize different communication protocols to transmit captured data or communicate with other systems. Despite such operational differences, computer systems may be configured to operate substantially seamlessly to implement functionality of software modules executed by different systems operating systems, hardware or networks.

The system may include a keyboard software module. The keyboard module may detect keyboard dynamics. Keyboard dynamics may be captured during user entry of information. The system may extrapolate paralinguistic cues based on captured keyboard dynamics.

Illustrative keyboard dynamics may include time between entered keystrokes, speed at which keystrokes are entered or the length of time that each key is pressed ("keystroke duration"). Additional keyboard dynamics may include punctuation, typing mistakes, pressure applied to pressed keys and fingertip acceleration. Keyboard dynamics may provide relevant contextual and behavioral clues that may be utilized by an automated tool interacting with a user.

An app operating on a mobile device may display a keyboard on a touch screen. The user may utilize the displayed keyboard to enter information into an app. The user may apply pressure to the displayed keys. The pressure may be detected by the touch screen. The computer system may correlate the detected pressure to a location on the touch screen and specific key displayed in that location. The keyboard module may measure the pressure applied by the user.

For example, based on detected pressure applied to keys, the system may assign an urgency level to the user's input. A relatively high pressure (e.g., 20 g/cm$^2$) may be assigned a higher-level urgency than a relatively lower pressure (e.g., 15 g/cm$^2$). Relatively fast fingertip acceleration (e.g., 5 cm/sec$^2$) may be assigned a higher-level urgency than relatively slow fingertip acceleration (e.g., 2 cm/sec$^2$).

The system may include a throttling software module. The throttling module may adjust the operation of the app in response to keyboard dynamics captured by the keyboard module. The throttling module may adjust the operation of the app in response to paralinguistic cues extrapolated from captured keyboard dynamics. For example, based on an assigned urgency level, the system may adjust operation of the app. Adjustments to the app operation may include locking a user interface associated with the app. Locking the user interface may prevent the user from entering any additional information.

The adjustments to operation of the app may include initiating a phone call to the user's mobile device. The system may detect that, based on the assigned urgency level, the user would be better served by interaction with a human respondent. The throttling module may adjust operation of the app by prompting a user to stop providing manual input to access a protected service. The throttling module may prompt the user to initiate an automated tool that provides access to the protected service. The automated tool may be a chatbot. The throttling module may pre-populate the chatbot with information based on prior user interaction with the app and the protected service.

For example, the throttling module may detect that the user opened a screen within a banking app to initiate a transfer of funds from one account to another account. The throttling module may also detect that the user has been applying higher-than-average pressure to enter the transfer amount. The throttling module may detect that the user has entered and deleted numbers at a higher frequency than average. The average may be defined to the user or for all app users. The throttling module may also detect that the balance in the user's account is below an average balance associated with the user's account.

Based on the amalgamation of detected factors, the throttling module may extrapolate paralinguistic cues. Based on the amalgamation of detected factors, the throttling module may determine an adjustment to operation of the banking app. For example, the throttling module may present the user with a pre-populated transfer request. The throttling module may pre-populate the transfer request based on past activity of the user. The throttling module may examine historical transfers initiated by the user under similar factors or when exhibiting a similar paralinguistic cues. The throttling module may adjust the operation of the banking app by suspending access to an interface that allows the user to manually enter transfer details. The suspending of the interface may prevent the user from entering and executing an erroneous transfer.

The throttling module may also monitor content of user inputs. The throttling module may weigh the content to determine a paralinguistic cue. For example, words that convey a negative meaning may cause the content to be associated with a relatively higher level of urgency. The throttling module may select a system response based on the determined paralinguistic cues.

In some embodiments, the throttling module may adjust operation of the app in response to detecting movement of the mobile device. The movement of the mobile device may be detected within a threshold time period before or after capturing user input. Vigorous movement of the mobile device may be indicative of a paralinguistic cues associated with higher-level urgency. Pressure applied to the mobile device (e.g., squeezing the device) may be indicative of a paralinguistic cues associated with higher-level urgency.

The throttling module may adjust operation of the app based on the urgency level. Adjustments to app operation may include configuring an automated tool to use a specialized dictionary of terms when formulating responses to the user. The specialized dictionary may include terms or phrases that are configured reduce a detected urgency level. The specialized dictionary may exclude terms or phrases that may increase a detected urgency level.

A method for dynamically adjusting an operational response of an application running on a mobile device is provided. The method may include initiating a keyboard module included within the application. The method may include using a throttling module included in the application to detect user input captured by the keyboard module. The method may include using the throttling module to determine an adjustment to operation of the application. The method may include using the throttling module to apply the adjustment.

The application running on the mobile device may operates at a default state. The adjustment to operation of the app may change the application to operate at an adjusted state. The method may include, at a predetermined time after applying the adjustment, reverting operation of the application to the default state.

The user input captured by the keyboard module may include typing speed. The operational adjustment applied to the application by the throttling module may include enlarging a size of keys presented on a touch screen. Enlarging the size of the presented keys may reduce likelihood that the user will enter unintended or erroneous input.

The operational adjustment applied to the application by the throttling module may include hiding alphabetic keys. The adjustment applied to the application by the throttling module may include displaying a numeric keypad. The throttling application may display pre-populated options for what the system determines the user is attempting to enter using the alphabetic keys. Because the numeric keypad includes fewer keys, the user may be able to enter numbers accurately and quickly when only a numeric keypad is displayed.

The user input captured by the keyboard module may include pressure applied to a touch screen. The adjustment applied by the throttling module may include hiding a virtual keyboard presented by the keyboard module and initiating a voice communication. The voice communication may include a voice call to the mobile device initiated by a human service agent. The voice communication may include a voice call initiated from the mobile to the human service agent. The human service agent may be capable of taking instructions from the user to implement one or more functions of the application.

The method may include assigning a meaning to user input captured by the keyboard module. When the assigned meaning is associated with a threshold level of negativity, the throttling module may adjust operation of the app to speed up automated responses provided by the application in response to user input. The speeding up of automated responses may provide the user more options within a predetermined timeframe.

The method may include, using the throttling module to detect movement of the mobile device. The movement may be detected within a threshold time period before or after capturing user input. In response to detecting the movement, the method may include adjusting operation of the app. The operational adjustment may include initiating a voice chat with the user. The movement of the mobile device may indicate that the user is not carefully entering manual inputs. The throttling module may determine that the needs of the user would be better serviced via a voice chat or voice call.

A system that dynamically adjusts operation of software running on a mobile device is provided. The system may include a processor. The system may include computer readable instructions stored on a non-transitory medium. The computer readable instructions may include a keyboard module. The computer readable instructions may include a throttling module.

The computer readable instructions when executed by the processor may implement functionality of the app and the associated system. The functionality may include providing access to a protected service via the mobile device. The functionality may include capturing user typing inputs provided as inputs to the app and protected services provided by the app. The typing inputs may be captured using the keyboard module.

The keyboard module may be included in the app. Including the keyboard module within the app may provide an additional layer of security for apps that provide access to protected services. A standalone keyboard module may require creating an access portal to access keyboard dynamics input to the app. The access portal creates an additional gateway that needs to be secured against unauthorized access to protected services provided by the app.

The throttling module may adjust the operation of the protected service in response to the user typing inputs. The user typing inputs may include typing speed. In response to detecting that the typing speed exceeds a threshold speed, the throttling module may adjust the operation of the protected service. Adjusting the operation of the protected service may include inserting a time delay prior to execution of a service request associated with the detected typing speed.

The inserted time delay may allow for the user to reconsider the service request before it is executed. For example, if the service request includes deletion of information, the user may abort the requested deletion during the time delay. If the service request includes a payment or other monetary transaction, during the time delay the user may abort the requested transaction or change details of the transaction.

The adjusting of the operation of the protected services may include initiating a voice chat with a provider of the protected service during the time delay. The voice chat may be automatically initiated on the user's mobile device. The voice chat may request that the user confirm a requested action or service request.

For example, user inputs may be entered by applying pressure to a touch screen. The applied pressure may select characters or other inputs displayed on the touch screen. The throttling module may detect that user inputs have been entered by applying pressure to that exceeds a threshold pressure. In response to detecting the excessive pressure, the computer readable instructions may enlarge keys displayed by the touch screen. The threshold pressure may be an average pressure applied detected for a plurality of users.

As a further example, the throttling application may categorize content entered by the user. The throttling application may categorize the content as being associated with a level of urgency. The throttling application may categorize the content as being associated with a level of negativity. The throttling application may categorize the content as being associated with a level of positivity. In response to the categorization of the content, adjust the operation of the protected service such that a human operator manages provision of the protected service to the user.

The content may be categorized based on punctuation entered by the user. In text messages, online chats and conversations conducted with automated tools, punctuation may be indicative of urgency. For example, in text-based conversations, inclusion of a period at the end of a sentence may indicate a higher-level urgency. Punctuation in text-based conversation may act as a proxy for paralinguistic cues in face-to-face conversations.

An explanation for the importance of meaning attributable to punctuation in text conversations may be that it takes time to type punctuation. Due to the high volume and rapid pace of text messages, punctuation is often omitted for the sake of expediency. Thus, over time through a process of normalization, the absence of punctuation has become a "neutral" tone marker. When a user takes time to type punctuation, that may indicate the user's request is associated with higher-level urgency.

For example, in a text conversation, a period may declare that the user is not happy about the statement just typed. On the other hand, while periods may be indicative of higher urgency, ellipses may extend an invitation for further conversation and interaction. This invitation for additional conversation may be associated with a lower-level urgency.

The throttling module may detect movement of the mobile device within a threshold time period. The threshold time period may be measured before or after capturing the user inputs via the keyboard module. In response to detecting the movement of the mobile device, the throttling module may assign a threshold urgency level to the user inputs.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative system 100. System 100 includes mobile device 101. Online banking application 103 is installed on mobile device 101. Online banking ("OLB") application 103 may be used to access a protected service. Apps, such as OLB 103 may provide access to financial information and are therefore protected services secured against unauthorized access.

Software application 105 is installed on mobile device 101. Software application 105 includes keyboard module 107 and throttling module 109. Keyboard module 107 may capture user inputs. For example, a user may enter transaction information while using OLB 103. Throttling module 109 may adjust operation of OLB 103 based on inputs captured by keyboard module 107. Inputs captured by keyboard module 107 may include any suitable keystroke dynamics.

Responsive adjustments to OLB 103 may include suspending a text conversation being conducted using an automated tool such as a chatbot. In lieu of the text conversation, throttling module 109 may initiate a voice or video call to connect the user of mobile device 101 to protected services provided by OLB 103. Over the voice or video call, the user may be connected to a human agent who many expeditiously resolve a task the user is attempting to accomplish via OLB 103. The voice or video call may expeditiously resolve a user inquiry regarding functionality of OLB 103 or information accessible via OLB 103.

Responsive operational adjustments to OLB 103 may include automatically hiding specific keys or enlarging specific keys displayed on mobile device 101. Such actions may reduce "decision fatigue" of the user attempting to provide inputs to an automated tool. The adjustment of keys displayed to the user may allow the user to provide targeted inputs more efficiently to the automated tool or human agent.

Figure 2:
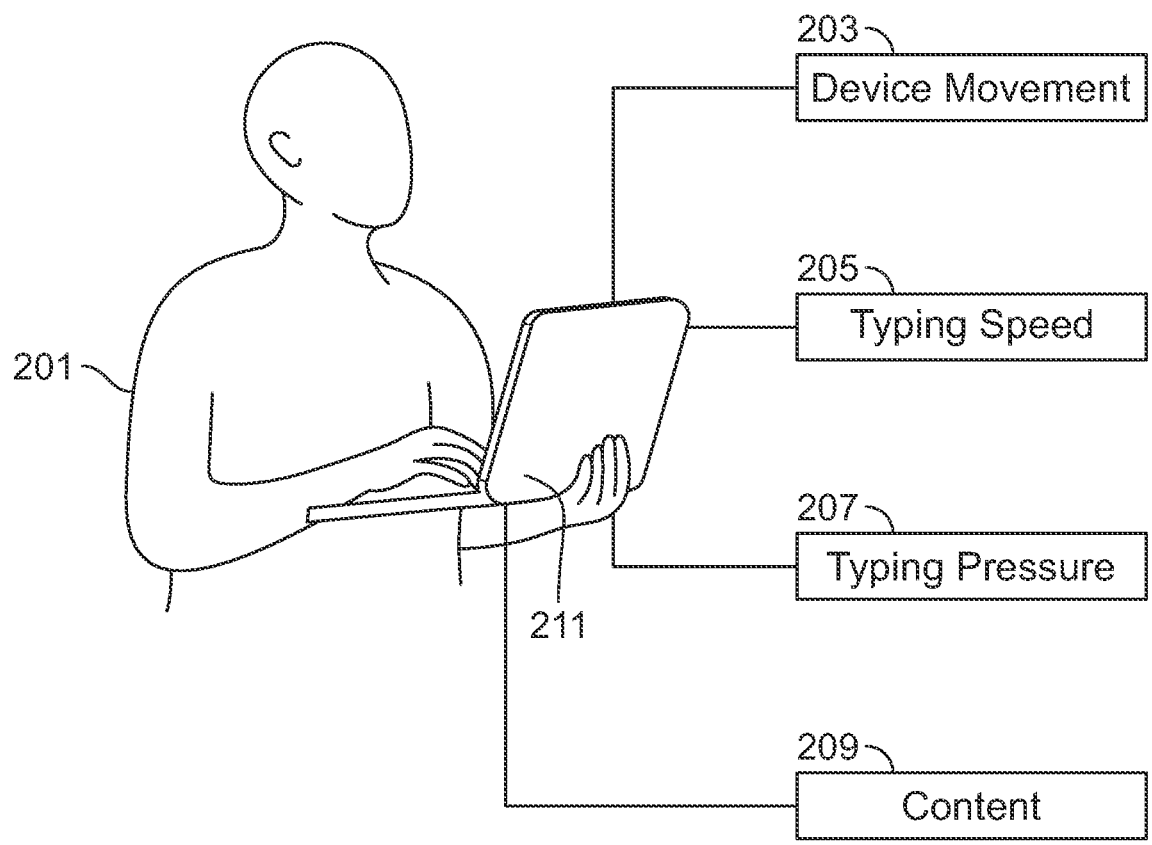
FIG. 2 shows an illustrative system and inputs in accordance with principles of the disclosure.

FIG. 2 shows illustrative keystroke dynamics that may be input by user 201 and monitored by throttling module 109. FIG. 2 shows that throttling module 109 may monitor a movement of mobile device 211 as user 200 enters information. Throttling module 109 may monitor movement 203 of mobile device 211 as user 201 enters inputs. Throttling module 109 may monitor typing speed 205 of user 201. Throttling module 109 may monitor typing pressure 207 applied by user 201 to a keyboard (virtual or mechanical) of mobile device 211. Throttling module 109 may monitor content 209 of inputs entered by user 201.

Based on keystroke dynamics detected by throttling module 109, throttling module 109 may adjust operation of OLB 103 or any other app running on mobile device 211. Throttling module 109 may adjust operation of an app running on mobile device 211 so that the app provides a more personalized and intuitive service to user 201 based on the detected keystroke dynamics.

Operational adjustments to an app may include automatically adjusting settings associated with a chatbot. The chatbot may provide access to features and functions of the app. Illustrative operational adjustments may include how long the chatbot waits before attempting to understand input provided by user 201. Illustrative operational adjustments may include how many inputs should the chatbot string together to understand inputs received from user 201. Illustrative operational adjustments may include shifting a user communication channel to or away from a chatbot.

Figure 3:
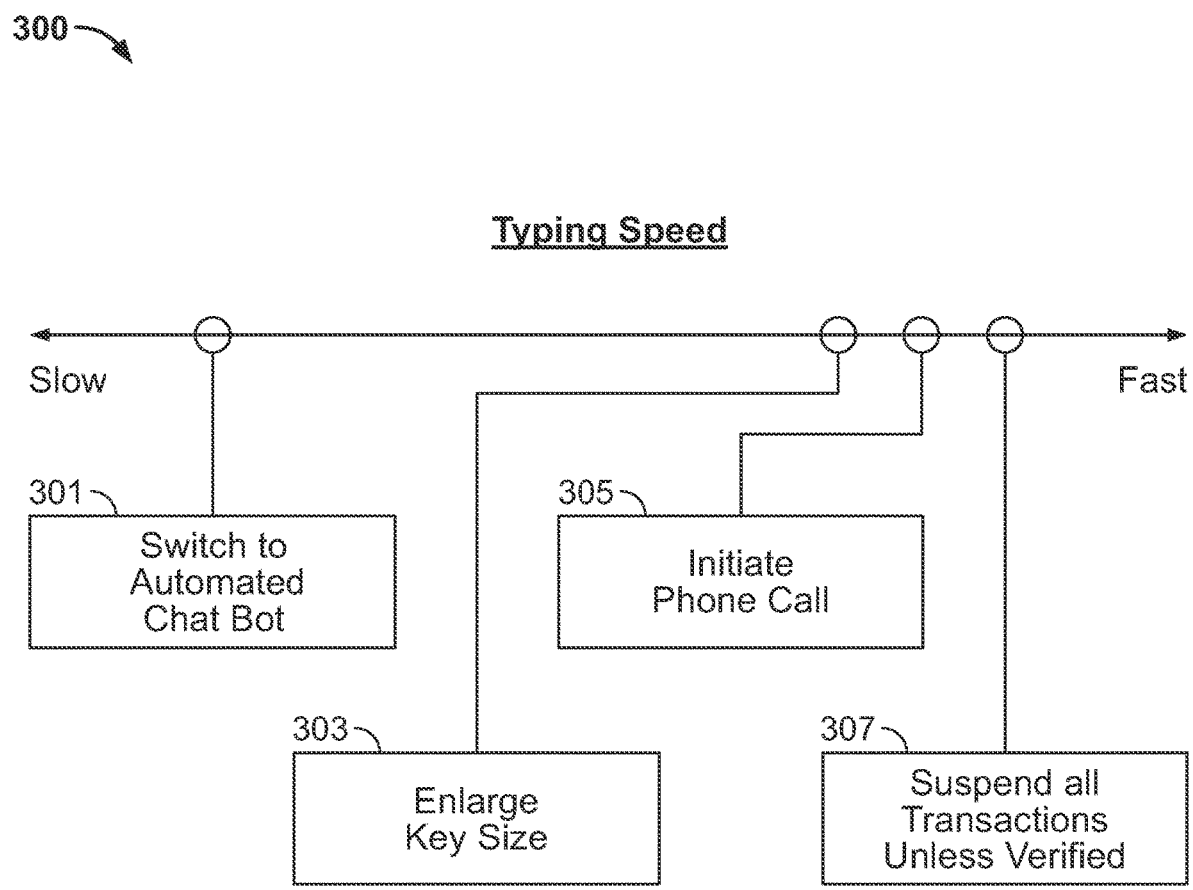
FIG. 3 shows illustrative operational responses of a system in accordance with principles of the disclosure.

FIG. 3 shows illustrative keystroke dynamics and associated operational adjustments that may be applied to an app by throttling module 109. In item 301, FIG. 3 shows that when detected typing speed is relatively slow, throttling module 109 may initiate a chatbot communication channel. When user 201 enters inputs relatively slowly, user 201 may not be entering an urgent request. When user 201 is entering information relatively slowly, a chatbot may have additional time to process inputs provided by user 201 before responding.

In item 303, FIG. 3 shows that when detected typing speed is relatively fast, throttling module may enlarge a font size of keys displayed on mobile device 211. Enlarging the font size may allow user 201 to enter information faster and more accurately.

Average typing speed on a mobile device such as a laptop computer that includes a mechanical keyboard may be 43 to 80 words per minute. In the context of typing speed, a "word" may be defined to be five characters or keystrokes long in English, including spaces and punctuation marks. Average typing speed on a smartphone using a virtual, touch sensitive keyboard display may be 35-65 words per minute.

Other operational adjustments made by throttling module 109 in response to detecting above-average typing speed may include displaying a keyboard that is optimized for typing on a smartphone. Such a display may include a hexagonal layout of keys and changing a position of keys relative to a standard QWERTY layout. Another illustrative operational adjustment may include changing an orientation of information presented on a smartphone from portrait to landscape mode. Presenting a keyboard in landscape mode may allow user 201 to enter information faster and with fewer errors.

Another illustrative operational adjustment may include activating a voice input mode. The voice input mode may allow user 201 to speak and translate captured speech into text input. Shifting the input communication channel from tapping text on a keyboard to voice-recognition mode may allow user 201 to enter input faster and more accurately. In item 305, FIG. 3 shows that when typing speed is faster than average, throttling module 109 may initiate a phone call to access app functionality. Shifting the input communication channel from tapping text to phone call may allow a human (or automated tool) to quickly ascertain how to solve a user problem.

In item 307, FIG. 3 shows that when typing speed is excessively fast, throttling module 109 may suspend execution of transactions or other tasks executed using OLB 103 or any other app on mobile device 201. Data entered by user 201 using excessively fast typing speeds may be more likely associated with errors and mistakes. In response to detecting such typing speed, throttling module 109 may require additional confirmation before executing any instructions entered at the excessively fast typing speeds.

Figure 4:
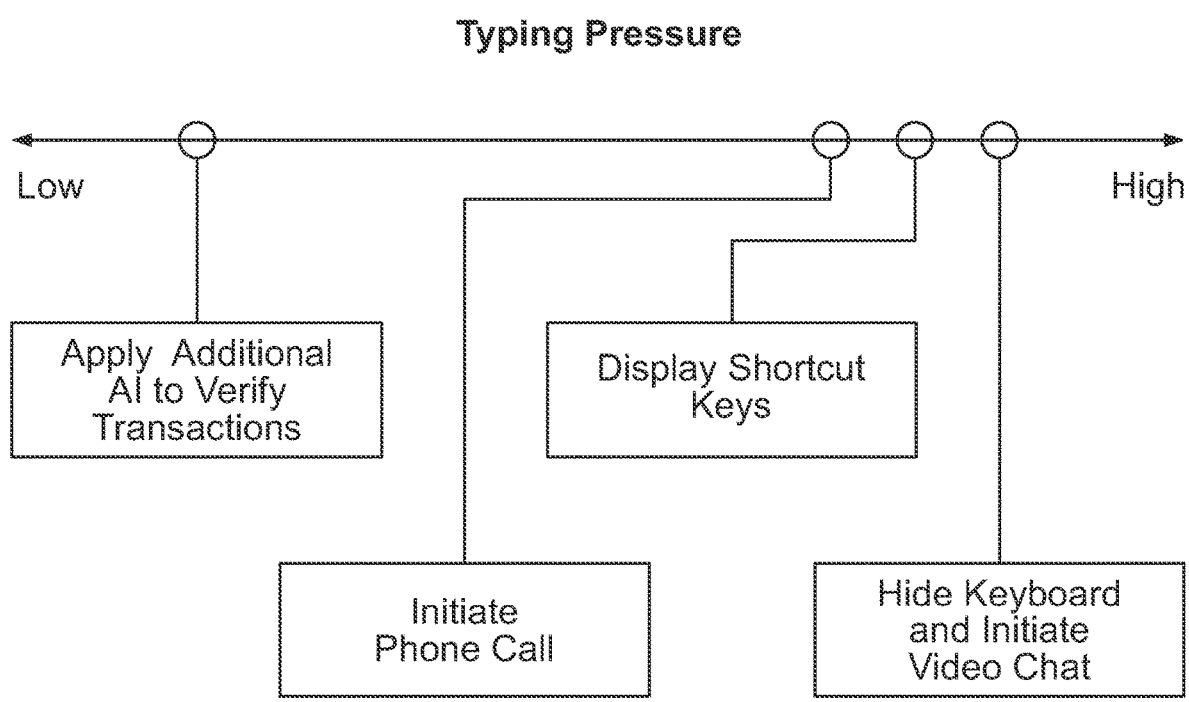
FIG. 4 shows illustrative operational responses of a system in accordance with principles of the disclosure.

FIG. 4 shows illustrative keystroke dynamics and associated operational adjustments that may be applied to an app by throttling module 109. FIG. 4 shows illustrative operational adjustments that may be to app in response to detected levels of typing pressure. Typing pressure may include pressure applied to a touch screen by a user's fingertips when typing. Average typing pressure may be defined as 15-25 $g/cm^2$.

In item 401, FIG. 4 shows that when typing pressure is lower than average, throttling module 109 may apply additional artificial intelligence to verify user inputs. Applying artificial intelligence may include applying one or machine learning algorithms to verify user entered inputs. Machine learning algorithms may include fuzzy logic to determine whether the user entered instructions are typical or expect for user 201. Illustrative machine learning algorithms may include AdaBoost, Naive Bayes, Support Vector Machine, Random Forests, Artificial Neural Networks and Convolutional Neural Networks.

In item 403, FIG. 4 shows that when typing pressure is higher than average, throttling module 109 may initiate a phone call to capture user input. When typing pressure is higher than average, typing inputs may be more likely to contain errors. Shifting the input communication channel from tapping text to a phone call may allow a human (or automated tool) to more accurately ascertain how to solve a user problem.

In item 405, FIG. 4 shows that when typing pressure is higher than average, throttling module 109 may display shortcut keys. Displaying shortcut keys may allow user 201 to enter information faster and more accurately. Throttling module 109 may apply one or more machine learning algorithms to determine which functionalities to display as shortcut keys.

In item 407, FIG. 4 shows that when typing pressure is excessively high, throttling module 109 may hide a virtual keyboard and initiate a video chat with user 201. Shifting the input communication channel from tapping text to a video chat may allow a human to more accurately ascertain how to solve a user problem or concern.

Figure 5:
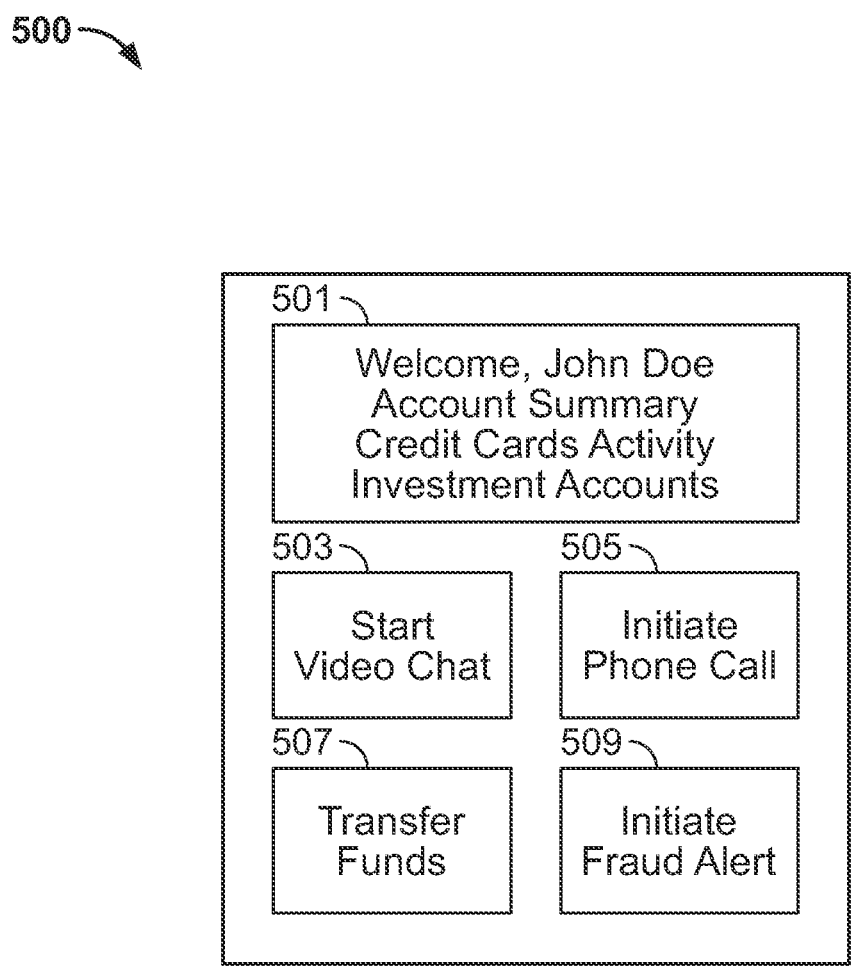
FIG. 5 shows illustrative operation of a system in accordance with principles of the disclosure.

FIG. 5 shows an illustrative screen shot 500 that may be presented during operation of an app, such as OLB 103. Screenshot 500 is shown after an operational adjustment by throttling module 109. For example, screenshot 500 may correspond to a view of an operational status of OLB 103 after throttle module 109 detects that typing pressure is higher than average.

Screenshot 500 displays welcome banner 501. Screenshot 500 shows that in response to detecting higher than average typing pressure, throttling module 109 has displayed shortcut keys 503, 505, 507 and 509. Shortcut key 503 may allow user 201 to start a video chat. Shortcut key 505 may allow user 201 to initiate a phone call. Shortcut key 507 may allow user 201 initiate a transfer of funds. Using shortcut key 507 to initiate a transfer of funds may include pre-populating values for transferred amounts and to/from accounts based on based historical transaction data. Shortcut key 509 may allow user 201 initiate a fraud alert.

Thus, apparatus and methods for an AUTO-ADJUST APP OPERATION IN RESPONSE TO DATA ENTRY ANOMALIES are provided. Persons skilled in the art will appreciate that the present disclosure can be practiced by other than the described embodiments, which are presented for purposes of illustration rather than of limitation. The present disclosure is limited only by the claims that follow.

What is claimed is:

1. A system that dynamically adjusts operation of software running on a mobile device, the software that embodies instructions is stored on a non-transitory computer-readable medium, the system comprising:
    an application that provides access to a protected service;
    a processor;
    a memory;
    a keyboard module that captures user input; and
    a throttling module that adjusts the operation of the application in response to the user input captured by the keyboard module;
wherein:
    the user input comprises a typing speed and a pressure applied to the keyboard module;
    in response to detecting that the typing pressure exceeds a first threshold pressure, the adjustment of the operation of the application comprises initiating a voice chat on the mobile device;
    in response to detecting that the typing pressure exceeds a second threshold pressure, greater than the first threshold pressure, the adjustment of the operation of the application further includes displaying shortcut keys on the mobile device;
    in response to detecting that the typing pressure exceeds a third threshold pressure, greater than the second threshold pressure, the adjustment of the operation of the application further includes hiding the keyboard module on the mobile device and initiating a video chat on the mobile device;
    in response to detecting that the typing speed exceeds a first threshold speed, the adjustment of the operation of the application comprises enlarging a size of keys presented by the keyboard module on a touch screen;
    in response to detecting that the typing speed exceeds a second threshold speed, greater than the first threshold speed, the adjustment of the operation of the application further includes initiating a voice chat on the mobile device; and
    in response to detecting that the typing speed exceeds a third threshold speed, greater than the second threshold speed, the adjustment of the operation of the application further includes suspending execution of all transactions executed by the mobile device; and the throttling module adjusts operation of the application by prompting a user to suspend interacting with a manual-input user interface to access the protected service and initiate a communication with an automated tool that provides access to the protected service.

2. The system of claim 1 wherein:
    the application operates at a default state and the adjustment changes the application to operate at an adjusted state; and
    a predetermined time after the adjustment, reverting operation of the application to the default state.

3. The system of claim 1 wherein in response to detecting the typing pressure is less than a fourth threshold pressure, lower than the first threshold pressure, the adjustment of the operation of the application further includes applying artificial intelligence to verify the user input.

4. The system of claim 3 wherein:
    the artificial intelligence includes applying one or more machine learning algorithms to verify the user input; and
    the machine learning algorithm includes fuzzy logic to determine whether the user input is typical for the user.

5. The system of claim 1 wherein the throttling module adjusts the operation of the application in response to movement of the mobile device within a threshold time period before or after capturing the user input.

6. The system of claim 1 wherein the throttling module adjusts operation of the application by locking a user interface associated with the application and initiating a phone call to the mobile device.

7. The system of claim 1 wherein in response to detecting that the typing speed exceeds a threshold speed, the computer readable instructions when executed by the processor enlarge keys displayed by a touch screen.

8. The system of claim 1, wherein the throttling module configures a setting of the automated tool based on the protected service and the user input captured by the keyboard module.

9. A method for dynamically adjusting an operational response of an application running on a mobile device that provides access to a protected service, the method comprising:
    initiating a keyboard module embedded within the application;
    using a throttling module embedded within the application:
        detecting user input captured by the keyboard module, wherein the user input comprises a typing speed and a pressure applied to the keyboard module;
        determining an adjustment to operation of the application in response to the detected user input; and
        applying the adjustment;
wherein:
    in response to detecting that the typing pressure exceeds a first threshold pressure, the applying of the adjustment comprises initiating a voice chat on the mobile device;
    in response to detecting that the typing pressure exceeds a second threshold pressure, greater than the first threshold pressure, the applying of the adjustment further includes displaying shortcut keys on the mobile device;
    in response to detecting that the typing pressure exceeds a third threshold pressure, greater than the second threshold pressure, the applying of the adjustment further includes hiding the keyboard module on the mobile device and initiating a video chat on the mobile device;

in response to detecting that the typing speed exceeds a first threshold speed, the adjustment of the operation of the application comprises enlarging a size of keys presented by the keyboard module on a touch screen;

in response to detecting that the typing speed exceeds a second threshold speed, greater than the first threshold speed, the adjustment of the operation of the application further includes initiating a voice chat on the mobile device; and in response to detecting that the typing speed exceeds a third threshold speed, greater than the second threshold speed, the adjustment of the operation of the application further includes suspending execution of all transactions executed by the mobile device; and the throttling module further applies the adjustment by prompting a user to suspend interacting with a manual-input user interface to access the protected service and initiate a communication with an automated tool that provides access to the protected service.

10. The method of claim 9 wherein the application operates at a default state and the applying of the adjustment changes the application to operate at an adjusted state, the method further comprising, a predetermined time after applying the adjustment, reverting operation of the application to the default state.

11. The method of claim 9 wherein in response to detecting the typing pressure is less than a fourth threshold pressure, lower than the first threshold pressure, the adjustment of the operation of the application further includes applying artificial intelligence to verify the user input.

12. The method of claim 11 wherein:
the artificial intelligence includes applying one or more machine learning algorithms to verify the user input; and
the machine learning algorithm includes fuzzy logic to determine whether the user input is typical for the user.

13. The method of claim 9 further comprising assigning a meaning to the user input and when the meaning is associated with a threshold level of negativity, the adjustment comprises speeding up automated responses provided by the application to the user input.

14. The method of claim 9 further comprising:
using the throttling module to detect movement of the mobile device within a threshold time period before or after capturing the user input; and
in response to detecting the movement, applying the adjustment comprises initiating a voice chat with the mobile device.

15. A system that dynamically adjusts operation of software running on a mobile device to access a protected service, the system comprising:
a keyboard module;
a processor, and computer readable instructions stored on a non-transitory medium, the computer readable instructions when executed by the processor:
provide access to the software on the mobile device;
captures typing inputs provided to the software by a user using the keyboard module; and
adjusts the operation of the software in response to the typing inputs of the user;
wherein:

the typing inputs comprise a typing speed and a pressure applied to a touch screen;

in response to detecting that the typing pressure exceeds a first threshold pressure, adjusting the operation of the software comprises initiating a voice chat on the mobile device;

in response to detecting that the typing pressure exceeds a second threshold pressure, greater than the first threshold pressure, adjusting the operation of the software further includes displaying shortcut keys on the mobile device;

in response to detecting that the typing pressure exceeds a third threshold pressure, greater than the second threshold pressure, adjusting the operation of the software further includes hiding the keyboard module on the mobile device and initiating a video chat on the mobile device;

in response to detecting that the typing speed exceeds a first threshold speed, the adjustment of the operation of the application comprises enlarging a size of keys presented by the keyboard module on a touch screen;

in response to detecting that the typing speed exceeds a second threshold speed, greater than the first threshold speed, the adjustment of the operation of the application further includes initiating a voice chat on the mobile device; and in response to detecting that the typing speed exceeds a third threshold speed, greater than the second threshold speed, the adjustment of the operation of the application further includes suspending execution of all transactions executed by the mobile device; and the throttling module adjusts the operation of the software by prompting the user to suspend interacting with a manual-input user interface to access the protected service and initiate a communication with an automated tool that provides access to the protected service.

16. The system of claim 15 wherein the adjustment of the operation of the software further comprises requiring additional confirmation in response to the typing pressure exceeding the third threshold pressure.

17. The system of claim 15 wherein in response to detecting the typing pressure is less than a fourth threshold pressure, lower than the first threshold pressure, adjusting the operation of the software further includes applying artificial intelligence to verify the user input.

18. The system of claim 15 wherein in response to detecting that the typing speed exceeds a threshold speed, the computer readable instructions when executed by the processor enlarge keys displayed by the touch screen.

19. The system of claim 15 wherein the computer readable instructions when executed by the processor categorize content corresponding to the typing input and in response to the categorization of the content, adjust the operation of the software such that a human operator manages provision, to the user, of a protected service accessible via the software.

20. The system of claim 15 wherein the computer readable instructions when executed by the processor:
detect movement of the mobile device within a threshold time period before or after capturing the typing inputs; and
deduce a threshold urgency level based on the detected movement.

* * * * *